UNITED STATES PATENT OFFICE.

PHILIP F. APFEL, OF SEATTLE, WASHINGTON, AND RALPH L. EARNEST, OF PORTLAND, OREGON.

FIREPROOF PAINT.

No. 882,774.   Specification of Letters Patent.   Patented March 24, 1908.

Application filed July 27, 1907. Serial No. 385,767.

*To all whom it may concern:*

Be it known that we, PHILIP F. APFEL, a citizen of the United States, residing at Seattle, in the county of King and State of Washington, and RALPH L. EARNEST, a citizen of the United States, residing in Portland, in the county of Multnomah and State of Oregon, have invented a new and useful Improvement in Fireproof Paint, of which the following is a specification.

Our endeavor in this invention has been to produce a durable and otherwise superior article of fire proof paint adapted to inside use where it will be protected from the weather, and to outside use where it will be exposed to the weather.

It consists in the novel composition hereinafter set forth.

In the preparation of our improved paint, we take one part calcined gypsum, one part calcined magnesite, and mix them thoroughly with an aqueous solution of magnesium chlorid of 18 to 24 degrees Baumé producing a mixture of desirable consistency the preferred degree of fluidity being substantially that usual to paint compounds.

The proportion of gypsum may be considerably varied as the gypsum gives adhesion, elasticity, whiteness and spreading quality. Iron oxid and iron carbonate or pigments in the form of a fine powder may also be added to the mixture to give color and to increase the wearing ability. Sand may be added to render the paint better able to resist the elements and climatic conditions.

We claim:—

1. A fireproof paint consisting of gypsum and magnesite, iron carbonate, and iron oxid, and an aqueous solution of magnesium chlorid.

2. A fireproof paint consisting of gypsum and magnesite in equal parts, iron carbonate, and iron oxid, and an aqueous solution of magnesium chlorid.

PHILIP F. APFEL.
RALPH L. EARNEST.

Witnesses as to Philip F. Apfel:
ELMER E. HARRISON,
CLARE E. MURPHY.

Witnesses as to Ralph L. Earnest:
WALLACE MCCAMANT,
FRED STEINER.